July 1, 1947.　　　A. Y. DODGE　　　2,423,178
ONE WAY CLUTCH AND BEARING
Filed Dec. 16, 1944
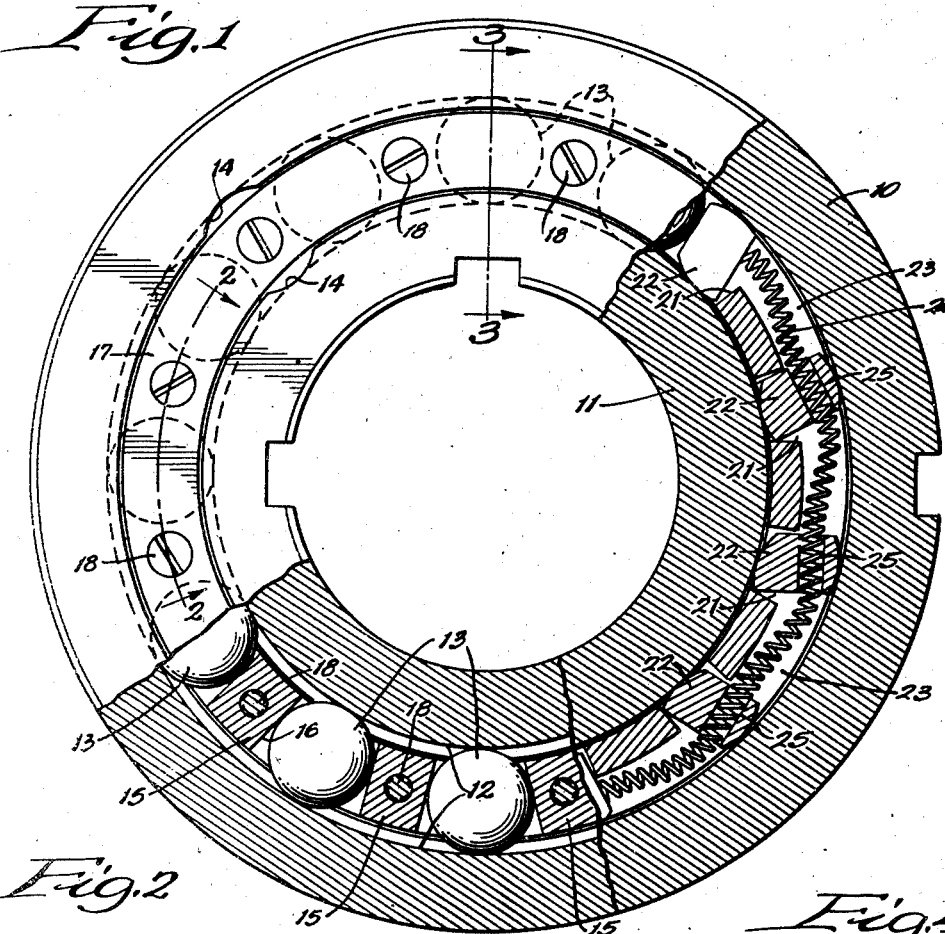
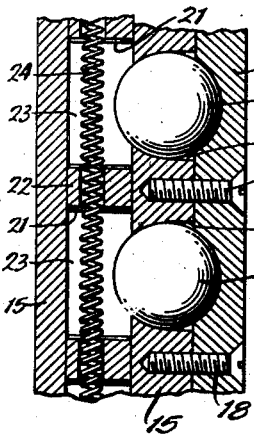
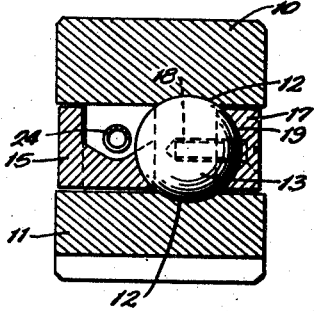
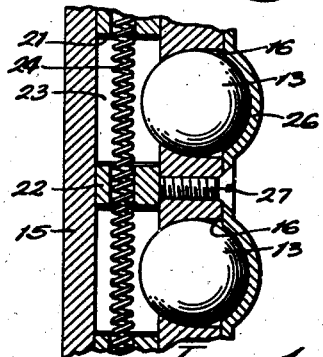
Inventor:
Adiel Y. Dodge,
By Dawson, Ons — Booth,
Attorneys.

Patented July 1, 1947

2,423,178

UNITED STATES PATENT OFFICE 2,423,178

ONE-WAY CLUTCH AND BEARING

Adiel Y. Dodge, Rockford, Ill.

Application December 16, 1944, Serial No. 568,451

9 Claims. (Cl. 192—45.1)

This invention relates to one way clutch and bearing and more particularly to a unit in which coaxial races are held against rotation in one direction but are freely rotatable relative to each other in the other direction.

One of the objects of the invention is to provide a one way clutch and bearing in which tiltable grippers are individually confined by a cage and are held in place by the cage. By means of an annular spring extending through openings in the grippers, they are urged to tilt into engagement with the races.

Another object is to provide a combined one way clutch and bearing in which grippers and bearing members are individually spaced by a single cage construction.

Still another object is to provide a one way clutch and bearing in which bearing balls rotatably connect the races and are individually spaced by a two part cage construction to permit easy assembly and disassembly of the bearing balls.

A still further object is to provide a combined one way clutch and bearing in which grippers and bearing balls are individually spaced by a single cage and in which the parts may be easily and quickly assembled and disassembled.

The above and other objects and advantages of the invention may be more readily apparent from the following description when read in connection with the accompanying drawing in which—

Figure 1 is a side elevation with parts in section of a one-way clutch and bearing embodying the invention;

Figure 2 is a partial section on the line 2—2 of Figure 1;

Figure 3 is a partial transverse section on the line 3—3 of Figure 1; and

Figure 4 is a view similar to Figure 2 of an alternative construction.

In the construction shown in Figures 1 to 3, an outer race 10 and an inner coaxial race 11 of smaller diameter than the race 10 are formed in their facing surfaces with circumferential arcuate grooves 12 in which a series of bearing balls 13 are adapted to ride. The races may be formed with loading slots 14 when necessary extending from one end of the races into the grooves 12 and of a size to permit insertion of the balls therethrough for assembly.

The balls are carried by an annular cage ring 15 which may be a die casting or the like and which is formed in one of its edges with a series of spaced slots 16 into which the balls fit. The balls are held in place in the slots by a retaining ring 17 detachably secured to the cage ring 15 by means of screws 18 or the like. The notches 16 are preferably curved radially at their inner ends and the retaining ring 17 is formed with radially curved recesses therein as indicated at 19 in Figure 3 having a slight clearance around the balls to permit a limited radial movement of the balls between the races while holding them properly spaced.

The cage ring is formed with a series of openings 21 therethrough spaced axially from the notches 16 and of a size to receive tiltable grippers 22. A circumferential groove 23 extends around the outer surface of the cage ring in line with the openings 21 therein to receive an annular coil spring 24 which is threaded through openings 25 in the grippers. The openings 25 lie at such an angle as shown in Figure 1, that the spring 24 will be bent laterally to create a couple acting on the grippers tending to tilt them into engagement with the races. Preferably the spring 24 is under tension so that it will tend to hold the grippers in the openings 21 to prevent radial displacement of the grippers when the cage ring is not assembled between the races.

To assemble the construction as shown, the grippers are placed in the openings 21 in the cage ring with the spring 24 threaded through the openings in the grippers. The cage ring is then inserted between the races and the balls are separately inserted in the notches in the usual manner. When a relatively small number of balls is used, they may be inserted without the loading slot but for a larger number of balls at least the last few will be inserted through the loading slots 14. Thereafter the retaining ring 17 is secured to the cage ring and the assembly is completed. It will be noted that the balls ride in the grooves 12 in the races so that the balls will be held against axial displacement and the races will be held against axial displacement relative to each other.

In operation when the races are turning relative to each other the balls will travel circumferentially at a speed between the speeds of the races and will cause the cage ring to move around relative to both of the races. When the races tend to turn in the direction in which the grippers will hold them against rotation, the cage ring engages the grippers and assists in tilting them into position to engage the races. Due to this action and the effect of the spring 24 on the grippers they will engage the races promptly and uniformly to lock them against relative rotation with a minimum of free travel. Since each of the grippers and bearing balls is individually supported by the cage proper spacing and uniform operation thereof are insured.

In the construction shown in Figure 4, the cage ring 17 is replaced by an annular stamping 26 detachably secured by screws 27 to the cage ring 15. The stamping 26 is formed with spherical depressions therein to receive the balls 13 and hold them properly in place in the notches 16 against circumferential displacement. Otherwise the construction is identical with that of Figures 1 to 3 and functions in the same manner.

While two embodiments of the invention have been shown and described herein it will be understood that these are illustrative only and are not intended as definition of the scope of the invention, reference being had for this purpose to the appended claims.

What is claimed is:

1. A one way clutch and bearing comprising a pair of coaxial races, a cage ring between the races having a series of peripherally spaced openings therein connected by a circumferentially extending groove in one face of the cage, tiltable grippers in the openings having circumferentially extending openings therethru, and an annular spring extending thru the openings in the grippers and lying in the groove in the cage ring.

2. A one way clutch and bearing comprising a pair of coaxial races, a cage ring between the races having a series of peripherally spaced openings therein connected by a circumferentially extending groove in one face of the cage, tiltable grippers in the openings having circumferentially extending openings therethru, an annular spring extending thru the openings in the grippers and lying in the groove in the cage ring, the cage ring having a second series of circumferentially spaced openings therein spaced axially from the first named series of openings, and bearing members in the last named openings engaging the races to connect them for relative rotation.

3. A one way clutch and bearing comprising a pair of coaxial races, a cage ring between the races having a series of peripherally spaced openings therein connected by a circumferentially extending groove in one face of the cage, tiltable grippers in the openings having circumferentially extending openings therethru, and an annular coil spring extending thru the openings in the grippers and lying in the groove in the cage ring, the openings in the grippers lying at an angle such as to bend the spring laterally whereby it tends to tilt them into engagement with the races.

4. A one way clutch and bearing comprising a pair of coaxial races, a cage ring between the races having a series of peripherally spaced openings therein connected by a circumferentially extending groove in one face of the cage, tiltable grippers in the openings having circumferentially extending openings therethru, an annular coil spring extending thru the openings in the grippers and lying in the groove in the cage ring, the cage ring being formed with a second series of openings spaced axially from the first series, and bearing members in the last named openings engaging the races to connect them for relative rotation.

5. A one way clutch and bearing comprising a pair of coaxial races, a cage ring between the races having a series of peripherally spaced openings therein connected by a circumferentially extending groove in one face of the cage, tiltable grippers in the openings having circumferentially extending openings therethru, an annular coil spring extending thru the openings in the grippers and lying in the groove in the cage ring, the cage ring being formed with a second series of openings spaced axially from the first series, and bearing balls in the last named openings engaging the races, the races being formed with grooves to receive the balls.

6. A one way clutch and bearing comprising a pair of coaxial races, a cage ring between the races having a series of peripherally spaced openings therein connected by a circumferentially extending groove in one face of the cage, tiltable grippers in the openings having circumferentially extending openings therethru, an annular spring lying in the groove in the cage ring and extending thru the openings in the grippers, the cage ring being formed at one edge with a series of open notches, bearing members in the notches, and a retaining ring detachably secured to the cage ring over the open ends of the notches to hold the bearing members therein.

7. A one way clutch and bearing comprising a pair of coaxial races, a cage ring between the races having a series of peripherally spaced openings therein connected by a circumferentially extending groove in one face of the cage, tiltable grippers in the openings having circumferentially extending openings therethru, an annular spring lying in the groove in the cage ring and extending thru the openings in the grippers, the cage ring being formed at one edge with a series of open notches, bearing balls in the notches, and a retaining ring detachably secured to the cage ring over the open ends of the notches, the notches and the retaining ring being so shaped as to hold the balls against radial displacement out of the notches.

8. A one way clutch and bearing comprising a pair of coaxial races, a cage ring between the races having a series of peripherally spaced openings therein connected by a circumferentially extending groove in one face of the cage, tiltable grippers in the openings having circumferentially extending openings therethru, an annular spring lying in the groove in the cage ring and extending thru the openings in the grippers, the cage ring being formed at one edge with a series of open notches, bearing balls in the notches, and a retaining ring detachably secured to the cage ring over the open ends of the notches, the races being formed with grooves in which the balls ride and having loading slots extending from the grooves to one face of the races.

9. A one way clutch and bearing comprising a pair of coaxial races formed in their facing surfaces with circumferential grooves, a cage ring between the races formed in one edge with a series of notches, bearing balls in the notches riding in the grooves in the races, a retaining ring detachably connected to the cage ring and fitting over the open ends of the notches to hold the bearing balls therein, the cage ring having a series of openings therethru, and tiltable grippers in the openings engageable with the races.

ADIEL Y. DODGE.

REFERENCES CITED

The following references are of record in the file of this patent:

UNITED STATES PATENTS

| Number | Name | Date |
|---|---|---|
| 2,342,227 | Swenson | Feb. 22, 1944 |
| 2,366,842 | Dodge et al. | Jan. 9, 1945 |
| 2,366,843 | Dodge et al. | Jan. 9, 1945 |
| 2,268,376 | Dodge | Dec. 30, 1941 |
| 1,738,359 | Dake | Dec. 3, 1929 |
| 1,857,823 | Robinson | May 10, 1932 |
| 1,928,352 | Goodell | Sept. 26, 1933 |